D. RYERSON.
RUNNING GEAR FOR VEHICLES.
APPLICATION FILED OCT. 18, 1913.
1,177,450.
Patented Mar. 28, 1916.
2 SHEETS—SHEET 1.
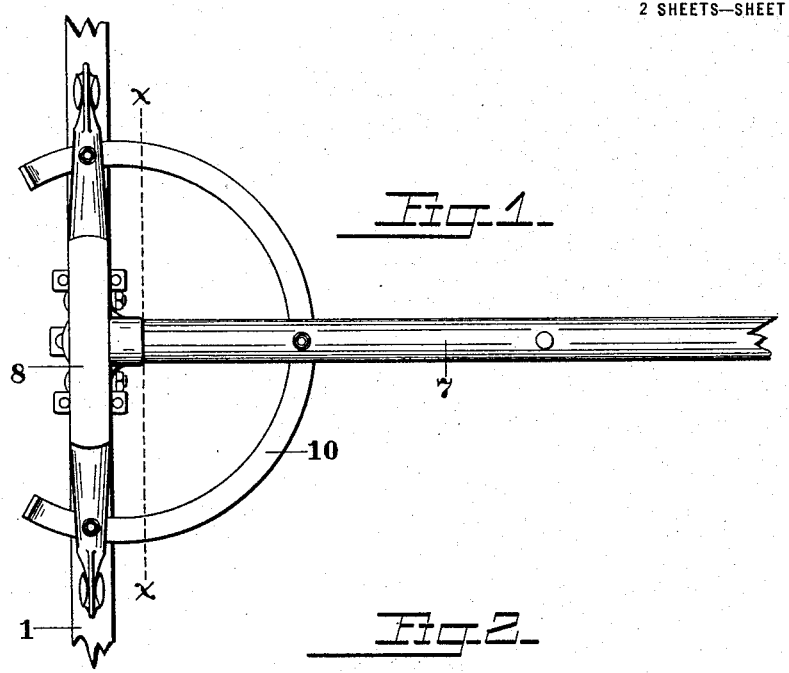
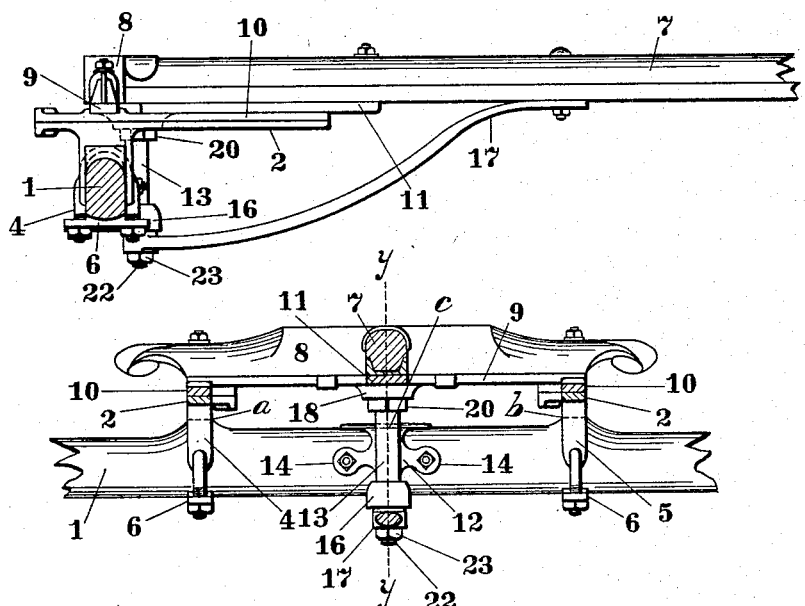

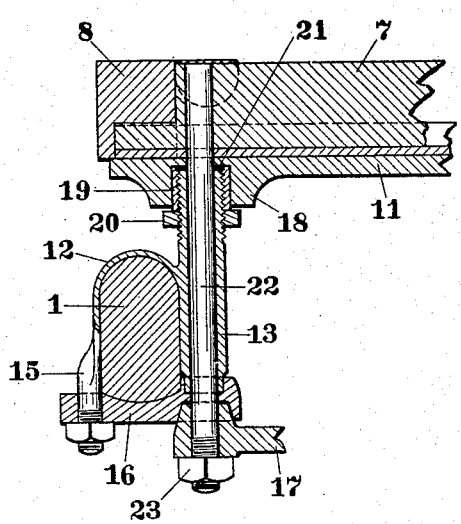

UNITED STATES PATENT OFFICE.

DANIEL RYERSON, OF MOLINE, ILLINOIS, ASSIGNOR TO VELIE CARRIAGE COMPANY, OF MOLINE, ILLINOIS, A CORPORATION OF ILLINOIS.

RUNNING-GEAR FOR VEHICLES.

1,177,450.  Specification of Letters Patent.  Patented Mar. 28, 1916.

Application filed October 18, 1913. Serial No. 796,040.

*To all whom it may concern:*

Be it known that I, DANIEL RYERSON, a citizen of the United States, residing at Moline, in the county of Rock Island and State of Illinois, have invented certain new and useful Improvements in Running-Gear for Vehicles, of which the following is a specification, reference being had therein to the accompanying drawing.

My invention relates to the running gear of vehicles, particularly carriages, and has for its object adjustment of certain parts to insure greater utility and to lessen the wear thereof, as will be more fully described in the following specification.

Referring to the drawings in which similar numerals indicate identical parts—Figure 1 is a plan view of part of the running gear of a vehicle embodying my improvement. Fig. 2 is a side elevation of Fig. 1. Fig. 3 is a section on the line $x$—$x$ of Fig. 1, and Fig. 4 is an enlarged section on the line $y$—$y$ of Fig. 3.

In the drawings a central portion of an axle 1 is shown to which is secured the lower member 2 of a fifth wheel by clips 4 and 5 preferably integral with the member 2. The clips 4 and 5 embrace the axle 1, their ends passing through clip straps to engage with nuts on the underside thereof, the tightening of the nuts clamping the clips firmly to the axle and holding the member 2 securely in position.

A reach 7 is mortised, or otherwise secured, to a head block 8 which is rigidly attached to a plate 9. The upper member 10 of the fifth wheel is preferably integral with the head block plate 9. An arm preferably integral with the plate 9 projects centrally therefrom and is secured to the reach 7. Centrally of the axle 1 is a king-bolt clip 12 having a vertical barrel 13 the upper end of which is threaded; on either side of the barrel 13 and forming part of the clip 12 are lugs 14 secured to the axle 1 by suitable bolts. A bolt 15, preferably part of the clip 12, passes through the forward end of a yoke 16, and is secured thereto by a nut; the forward end of the yoke 16 is enlarged and has a socket in its upper side in which is fitted the lower end of the barrel 13; the lower side of the forward end of the yoke 16 has a socket in which is fitted the frusto-conical end of a brace 17 which extends to the reach 7 to which it is secured.

On the underside of the plate 9 is a boss 18; as before stated the upper end of the barrel 13 is threaded; on this threaded end I place a sleeve 19 threaded to engage with the threaded end of the barrel 13 and movably fitting in a socket 21 in the boss 18 on the plate 9, and below the sleeve 19 is a lock nut 20. When the parts heretofore described are assembled, a king bolt 22 is passed through a suitable opening in the reach 7 and arm 11, and through the barrel 13, the enlarged end of the yoke 16 and the frusto-conical end of the brace 17; a nut 23 engages with the lower end of the king bolt 22 which is threaded for that purpose, so that operating the nut in the proper direction the parts through which the king bolt 22 passes are drawn closely together in operative position.

In the ordinary manufacture of a mechanism as I have shown and described, the points $a$ and $b$ on the axle and the point $c$ thereon must have a fixed relation to each other, that is the points $a$ and $b$ must be an equal distance above the point $c$; it is very often the case, however, that variations occur due to inequalities in the forgings and other causes, which result in excessive wear on the fifth wheel if the point $c$ is too far below the plane of the points $a$ and $b$, but if the plane of the point $c$ is too close to the plane of the points $a$ and $b$, the members 2 and 10 of the fifthwheel will be held apart to the damage of the structure. To overcome these objectionable conditions I operate the nut 20 and sleeve 19, first loosening or removing the nut 23 so that the head block 8, attached plate 11 and the member 10 of the fifthwheel can be raised a sufficient distance, then to further separate the members 2 and 10 of the fifthwheel I turn the sleeve 19 moving it toward the upper end of the barrel 13 and when the desired adjustment is made, the nut 20 is turned until in jam contact with the sleeve 19 holding the latter securely in position; the reverse of the operation just described will bring the members 2 and 10 of the fifthwheel closer together.

It will be observed that the construction of the head block plate 9 and king bolt clip 12, otherwise termed the axle clip, having the tubular part or barrel 13 thereon to receive the king bolt, and the adjustable cylindrical body or sleeve 19 on said barrel is such as to effectually provide a bearing element on said plate and a bearing element on the axle with adjustable means located between and movable independently of said bearing elements for raising the head block and supporting it at different distances from the axle, and that the desired adjustment is accomplished by rotation of the threaded element 19 relatively to said bearing elements, to separate and support said bearing elements at different distances from each other, and the parts locked in the desired position by the lock nut 20, which secures the threaded sleeve against rotation.

By this construction the weight of the forward portion of the vehicle is carried by the barrel 13 instead of the fifth wheel and the wear on the latter can be practically eliminated; the barrel 13 and clip 12 of which it forms a part are constructed to safely bear any weight ordinarily carried by a vehicle of the class in which they are used, and to withstand lateral strain that may be brought upon the clip 12 and barrel 13, the lugs 14 are provided, preferably integral with the barrel 13 and securely bolted to the axle 1.

What I claim is—

1. The combination in a vehicle gear of a tube threaded at one end and a threaded nut on the tube in frictional engagement with the lug of a head block plate, the said tube being supported by the axle clip and axle yoke.

2. In a vehicle gear, the combination with an axle, of a head block plate, a clip secured upon said axle, a barrel on said clip having its upper end threaded, a socket in the head block plate in which the upper end of the barrel is vertically movable, a sleeve on the threaded end of the barrel and adapted to be turned to vertically adjust the barrel and head block plate relatively to each other.

3. In a vehicle gear, the combination with an axle, of a head block plate, a clip secured upon said axle, a barrel on said clip having its upper end threaded, a socket in the head block plate in which the upper end of the barrel is vertically movable, a sleeve on the threaded end of the barrel and adapted to be turned to vertically adjust the barrel and head block plate relatively to each other, and a nut on said barrel to lock said sleeve in position after adjustment.

4. In a vehicle gear, an axle clip having a barrel thereon, in combination with a head block plate having a socket therein in which the upper end of said barrel is seated, and means carried by said barrel for adjusting the head block plate and barrel relatively to each other.

5. The combination in a vehicle gear of a head block plate having a socket therein, an axle clip having an integral tubular part to receive the king bolt, and adjustable means between said plate and tubular part for moving the head block plate and supporting it at different distances from the axle.

6. The combination in a vehicle gear of a head block plate having a socket therein, an axle clip having an integral tubular part extending into said socket, a king bolt extending through said tubular part and socket, and a cylindrical body rotatably mounted on said tubular part and adapted by its rotation to adjust the head block plate and tubular part relatively to each other.

7. The combination with an axle clip having a tubular portion thereon to receive the king bolt and a yoke on the prongs of the clip having at one end a recess in the upper side thereof, of a head block plate having a socket on the underside thereof; said tubular part having its lower end seated in said recess and its upper end seated in said socket, and means on said tubular part for adjusting the head block plate relatively thereto.

8. The combination of a head block having a bearing element, an axle provided with a bearing element, a king bolt, and adjustable means located between and movable independently of said bearing elements for raising the head block and supporting it at different distances from the axle.

9. The combination of a head block having a bearing element, an axle having a bearing element, one of said elements being threaded, a threaded element adapted to be bodily rotated relatively to said bearing elements to separate and support said elements at different distances from each other, and means for locking said threaded element against rotation.

10. The combination of a king bolt clip having a head with screw threads, a head block plate, and means having threads engaging the threads of the said clip head and bodily adjustable relative to the head for moving and supporting the head block plate at different distances from the king bolt clip.

11. The combination of an axle; a king bolt clip having a head with screw threads; a head block plate with a lug; fifth wheel members secured to the axle and head block plate; and means having threads matching the threads of the clip head, bearing against the under surface of the said lug, and movable relative to the said head for adjusting the upper fifth wheel member relative to the lower fifth wheel member without detaching part of the gear from the vehicle.

12. The combination of a king bolt clip having a perforated and threaded head; a head block plate having a perforated lug; a king bolt within the perforations of the said head and the said lug; and independent bodily movable means with threads located between the said head and said lug for adjusting the head block plate relative to the said head and without detaching parts of the gear.

13. The combination of a clip having a perforated and threaded head; a plate with a perforated lug; an independent hollow threaded cylinder between the said head and said lug; and a king bolt within the perforations of the said head and lug; said cylinder being bodily movable relative to the said head and without detaching part of the gear from the vehicle.

In testimony whereof I affix my signature, in presence of two witnesses.

DANIEL RYERSON.

Witnesses:
JOSEPH DAIN, Jr.,
JESSIE L. SIMSER.

Copies of this patent may be obtained for five cents each, by addressing the "Commissioner of Patents, Washington, D. C."